UNITED STATES PATENT OFFICE 2,557,997

DEFOLIANT AND HERBICIDE

Richard L. Phelps, Canonsburg, Pa., and Jason M. Salsbury, Stamford, Conn., assignors to American Cyanamid Company, New York, N. Y., a corporation of Maine No Drawing. Application July 15, 1949, Serial No. 105,060

3 Claims. (Cl. 71—2.2)

The present invention relates to plant husbandry, and more particularly to the defoliation and/or killing of plants. The invention further contemplates the preparation of materials suitable for such purposes. More particularly, the invention relates to a defoliant or herbicide comprising an alkali metal acid cyanamide and its preparation.

It is an object of this invention to prepare an alkali metal acid cyanamide by spray drying. It is a further object to prepare a dust defoliant suitable for use in arid regions. Still other objects will appear from the following description of the invention.

The alkali metal acid cyanamides are valuable defoliants and may be prepared in aqueous solution by reacting free cyanamide, $NH_2CN$, with an alkali metal compound such as sodium hydroxide, or a metallic cyanamide such as calcium cyanamide may be reacted with a soluble alkaline material and filtered, or the acid cyanamides may be prepared in various other typical reactions.

Prior to the present invention, however, no commercial means of recovering the alkali metal acid cyanamides in solid form from their aqueous solutions was known. Spray drying, a preferred method of recovering the alkali metal acid cyanamide from solution, was found to be inoperable because filtered aqueous solutions of the alkali metal acid cyanamides tended to deposit on the walls of the spray drier.

The surprising discovery has now been made that if the alkali metal acid cyanamide is prepared by reacting lime nitrogen (crude calcium cyanamide) with an alkali metal compound, such as the carbonate, in water, and that if the inert solid material, such as calcium hydroxide, calcium carbonate, graphite, etc., is left in the reaction mass instead of being filtered off, the so constituted slurry may be effectively spray dried, and will not build up on the spray tower walls.

A further remarkable feature of the invention lies in the fact that the dry material recovered without separating water-insolubles therefrom is more effective as a defoliant than the purest commercially available alkali forming metal acid cyanamide, and this is true whether the former is recovered by spray drying, drum drying, or by any other methods of dehydration. This synergistic phenomenon was not to be expected.

Accordingly, in addition to a new method of making a defoliant, the invention also comprehends the novel product resulting from the reaction of an alkali metal carbonate (or bicarbonate, or hydroxide) with calcium cyanamide in water, followed by drying and recovering all solids in comminuted form.

When the product is to be used as a defoliant it is preferred to adjust the spray drier to yield a fine dust, or else to yield a coarse dust, followed by grinding.

Using the respective sodium compounds to illustrate, it is believed that the following reactions take place:

(1) $2CaNCN + 2H_2O + Na_2CO_3 \rightarrow 2NaHNCN + CaCO_3 + Ca(OH)_2$
(2) $CaNCN + NaHCO_3 \rightarrow CaCO_3 + NaHNCN$
(3) $CaNCN + H_2O + NaOH \rightarrow NaHNCN + Ca(OH)_2$ The following example, demonstrating the use of sodium carbonate, illustrates the invention, but is not intended to limit it.

To a reaction vessel was charged 2450 lbs. of water which was heated to 60° C. A total of 1630 lbs. of lime nitrogen and 663 lbs. of sodium carbonate was then fed into the vessel, approximately one-third of the sodium carbonate being added before addition of the lime nitrogen, and the remainder of the sodium carbonate simultaneously in order to moderate the exothermic reaction. The reaction was carried out at 60° C. for 1½ hours and then the resultant slurry was pumped to the spray dryer feed tank. It may be found desirable to pump fresh water after the slurry in order to prevent settling out of insolubles in the lines. The material was then spray dried in conventional apparatus. The product as recovered from the spray dryer averages about 11% cyanamide nitrogen. The overall recovery of cyanamide nitrogen is about 77%.

An equivalent amount of alkali metal carbonate, hydroxide, or bicarbonate may be substituted for the sodium carbonate of the example.

Considerable variation is possible in the proportions of the reactants. However, the cheapest and most effective material results from a stoichiometric ratio of reactants (including free calcium oxide and hydroxide in the lime nitrogen). Considerable variation is also possible in the reaction time and in the temperature. However, if the temperature is substantially lower than 60° C., the time of reaction should be proportionately lengthened. It is preferred, however that the temperature not greatly exceed 60° C. since higher temperatures favor the decomposition of cyanamide nitrogen.

A considerable variation in the concentration of aqueous lime nitrogen slurry is permissible. In general, it may be said that the more concentrated the slurry, the more concentrated a solution of sodium acid cyanamide will be obtained, but with a greater loss of cyanamide nitrogen. The optimum slurry concentration when extracting with sodium hydroxide has been determined to be 35% at 50° C.; with sodium carbonate, 40% at 60° C. The optimum reaction time is about 1½–2 hours in either case.

If desired, some of the solids may be filtered from the slurry before it is sent to the spray dryer without affecting the efficiency or recovery in the spray tower. For example, on one experiment one-half of the solids were filtered off without appreciably decreasing efficiency within the spray chamber. However, if much more than one-half of the solids are removed, material begins to adhere to the spray tower walls.

While a considerable variation in the temperature of the spray drying gases is possible, it has been found that considerable fusion on the chamber walls takes place when the inlet temperature reaches 315° C. (corresponding outlet temperature about 245° C.). Lower temperatures in the range of about 295° C. inlet, and 160°–205° C. outlet, have been found satisfactory.

The rate of feed into the spray dryer may vary over wide limits, depending on dryer design. For example, for a 12-foot dryer of conventional design a feed rate of 30–40 lbs. of liquor per min. is preferred.

Material prepared according to the method of this invention is an excellent dust defoliant, and as mentioned above, is superior as a defoliant to sodium acid cyanamide undiluted with insoluble calcium compounds, when the actual contents of sodium acid cyanamide in the two materials are compared on a lb./acre bases. This superiority is particularly evident when the two defoliants are compared under dry conditions, as follows:

Percent defoliation of red kidney beans when dusted with compounds containing varying percentages of monosodium cyanamide.]

| Compound | Lbs./Acre of cpd.[1] | Lbs./Acre of Monosodium Cyanamide | Per cent Defoliation Applied to Dry Plants |
|---|---|---|---|
| Monosodium cyanamide from which insoluble matter has been filtered | 60.6 | 40 | 75 |
| Do | 30.3 | 20 | 61 |
| Do | 15.15 | 10 | 36 |
| Monosodium cyanamide made by spray drying reaction product of calcium cyanamide and Na$_2$CO$_3$, without filtering | 163.8 | 40 | 89 |
| Do | 81.9 | 20 | 79 |
| Do | 40.95 | 10 | 75 |

[1] This represents the amount of product applied. It was diluted further with talc to make a total of 200 lbs./acre of dust applied.

Heretofore, particularly in the arid irrigation regions, it has been necessary to apply defoliants in an aqueous spray or as a dust accompanied by a wetting agent. The defoliant of the present invention, however, may be applied as a dust without such accompanying wetting agent. Despite its content of alkali metal hydroxide, it is free flowing.

The inventors are unable to explain why aqueous sodium acid cyanamide dried by spray drying or by other methods in the presence of inert diluents such as calcium carbonate and/or calcium hydroxide should be much more effective as a defoliant than the same amount of a sodium acid which was not dried in the presence of such inert material. In any event, however, it is evident that an inert diluent contributes to a marked increased efficiency of the defoliant only if present during drying.

Such a compound has a number of uses in plant industry. An important use, for example, is in the defoliation of cotton. In the case of cotton plants, defoliation at a certain stage in its life is highly desirable, as not only does it expose the lower bolls, which in a luxuriant plant are made inaccessible to sunlight, for ripening purposes, but is also desirable from the standpoint of efficient picking, whether by hand or by machine.

In hand picking of cotton, considerable time is lost in hunting for the open bolls because they are hidden in the foliage. If, therefore, the plant were defoliated, such bolls would be readily discernible and a more rapid picking could be accomplished.

In machine picking of cotton, the practice is to permit the plant to reach its optimum maturity and then to strip the plant of its open bolls on one pass. If there are dried leaves on the plant at this time, not only is the product littered with them (commonly termed in the trade "trash") but there is a tendency for the green leaves to be crushed, and resultant staining of the cotton with chlorophyll. This abnormal color is impossible to remove and definitely lowers the grade of the cotton so obtained.

Cotton defoliation has other advantages than those mentioned above, such as the control of the boll weevil and of the cotton aphid.

Other plants that are susceptible to defoliation by the application of alkali metal acid cyanamide-containing compounds are tomatoes (applying about 6–20 lbs. of contained sodium acid cyanamid/acre), beans (20–40 lbs./acre), peppers (10–20 lbs./acre), ramie (6–20 lbs./acre), fruit trees (such as peach, plum, apple, and tangerine) (20–40 lbs./acre), nut trees, ornamental shrubs and nursery stock (15–30 lbs./acre). Defoliation of these plants may be carried out for various reasons, such as hastening maturity, increasing the yield of the fruit, insect control, plant disease control, and the like.

The amount of alkali metal acid cyanamide-containing material necessary for proper defoliation will vary according to the plant, area, stage of growth, and various other factors. The application for cotton defoliation is generally about 10 lbs./acre exclusive of inert diluents, such as talc, kieselguhr, etc. This amount, however, is too small to defoliate beans, and at least about 20 lbs./acre is ordinarily necessary for that purpose as already noted. In general, it may be found that an amount of at least 3 lbs./acre will be necessary, but rarely over 150 lbs./acre. It will ordinarily be found that the amount of alkali metal acid cyanamide necessary to cause desirable defoliation may be doubled, quadrupled, or otherwise greatly increased without killing the plant. In this respect, it enjoys a considerable advantage over various other defoliants that operate as defoliants only within a fairly narrow range of application, serving to kill the plant instead of defoliating it above that range.

Defoliation is accomplished by the development of an abscission layer in the petiole of the plant, said development being induced by injury to the leaves. This abscission layer is very weak and the leaf is easily broken off from the stalk in a slight wind. Only certain species of plants form the abscission layer, and only at maturity.

Materials that contain an alkali metal acid cyanamide are also good selective contact herbicides when applied in amounts ranging from 5–20 lbs. per acre. The term "selective contact herbicide" is generally applied to one that spares the crop while killing young weeds. Thus, the alkali metal acid cyanamides are useful in deweeding row crops, including onions and related crops, asparagus, corn, sugar cane, peas, and crucifers. They are also useful in deweeding such crops as the small grains, including wheat, rye, oats, barley, flax, and rice, and are selective contact herbicides for lawns and pastures, orchards and vineyards, cranberry bogs, dodder, alfalfa and clover, ornamentals such as irises, gladioli, tulips, lilies, narcissi, carnations, and for nursery and forestry beds.

Another important use of materials that contain sodium (or other alkali metal) acid cyanamide is in the killing of perennial weeds. Since sodium acid cyanamide is not readily translocated in plants, it is generally necessary to repeat the treatment on the appearance of new growth.

As in defoliating with alkali metal acid cyanamide-containing materials, plant killing with the said materials likewise varies according to the plant, area, stage of growth, and other factors.

While the invention has been described with particular reference to specific embodiments, it is to be understood that it is not to be limited thereto but is to be construed broadly and restricted solely by the scope of the appended claims.

We claim:

1. The product obtained by reacting lime nitrogen with a member of the group consisting of sodium hydroxide and sodium carbonate, followed by drying and comminuting the resultant reaction mass, said product having superior herbicidal and defoliation properties over an equal amount of pure contained sodium acid cyanamide.

2. A method of defoliating plants which includes the step of applying to the leaves a product of claim 1 in a quantity sufficient to cause the leaves to drop off of the living plant.

3. A method of killing plants which includes the step of applying to the leaves a product of claim 1 in a quantity sufficient to kill the plant.

RICHARD L. PHELPS.
JASON M. SALSBURY.

REFERENCES CITED

The following references are of record in the file of this patent:

UNITED STATES PATENTS

| Number | Name | Date |
| --- | --- | --- |
| 2,213,441 | Ashley et al. | Sept. 3, 1940 |
| 2,368,601 | Torley | Jan. 30, 1945 |

FOREIGN PATENTS

| Number | Country | Date |
| --- | --- | --- |
| 376,392 | Great Britain | July 14, 1932 |